March 31, 1953 W. W. STRICKLEN ET AL 2,632,990
LAWN EDGER AND TRIMMER
Filed Aug. 19, 1950 4 Sheets-Sheet 3

INVENTORS:
Walter W. Stricklin &
BY Linza B. Holston.
Ⴤ. S. Woodbury
Attorney.

March 31, 1953    W. W. STRICKLEN ET AL    2,632,990
LAWN EDGER AND TRIMMER
Filed Aug. 19, 1950    4 Sheets-Sheet 4
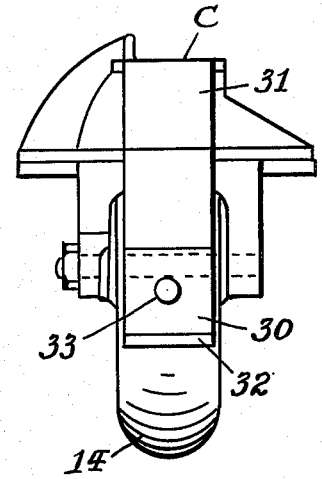
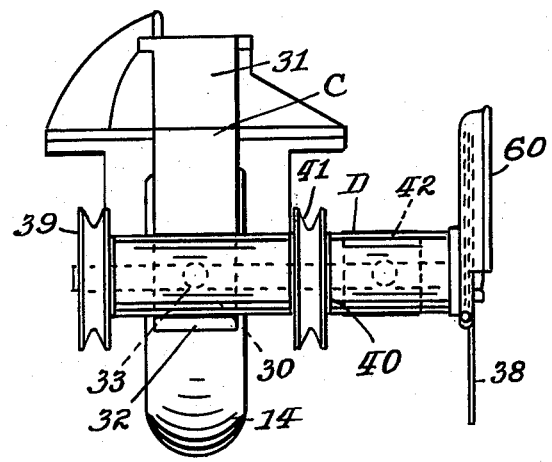
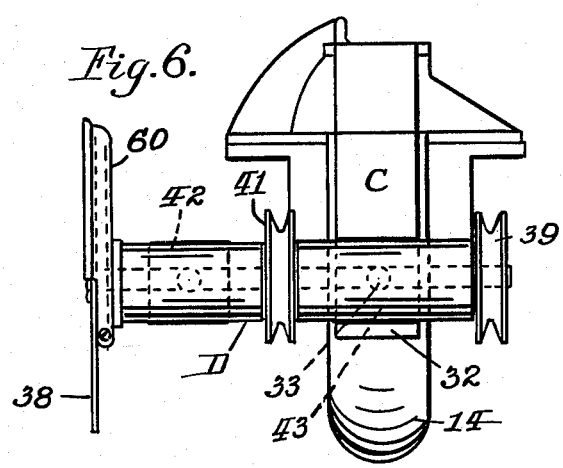
INVENTORS:
Walter W. Stricklin &
BY Linza B. Holston
F. G. Bradbury
Attorney.

Patented Mar. 31, 1953

2,632,990

UNITED STATES PATENT OFFICE 2,632,990

LAWN EDGER AND TRIMMER

Walter W. Stricklen and Linza B. Holston,
Linwood, Calif.

Application August 19, 1950, Serial No. 180,462

7 Claims. (Cl. 56—25.4)

Our invention relates to a lawn edger and trimmer. The primary object of our improvement is to provide a combined edger and trimmer which will cut and trim growth along straight, angular and curved edge portions of lawns and other surfaces in a quick, and sharply cut manner without leaving any ragged or uncut portions. Another object is to provide means for cutting and trimming edges which are difficult to cut. Another object is to provide means by which growth can be cut and trimmed on the right or left side of the machine or straight ahead in front as the latter is propelled. Another object is to provide means by which the rotary cutting blade which is used can be applied while in substantially vertical or horizontal position and can be off-set on either side of the machine. Another object is to provide means by which the cutting blade is power driven in such manner that a belt drive can be applied and effectively used to rotate a rotary cutter blade in any of its uses.

With these and other objects in view our invention comprises the features of construction and combination of parts hereinafter described.

Figure 1:
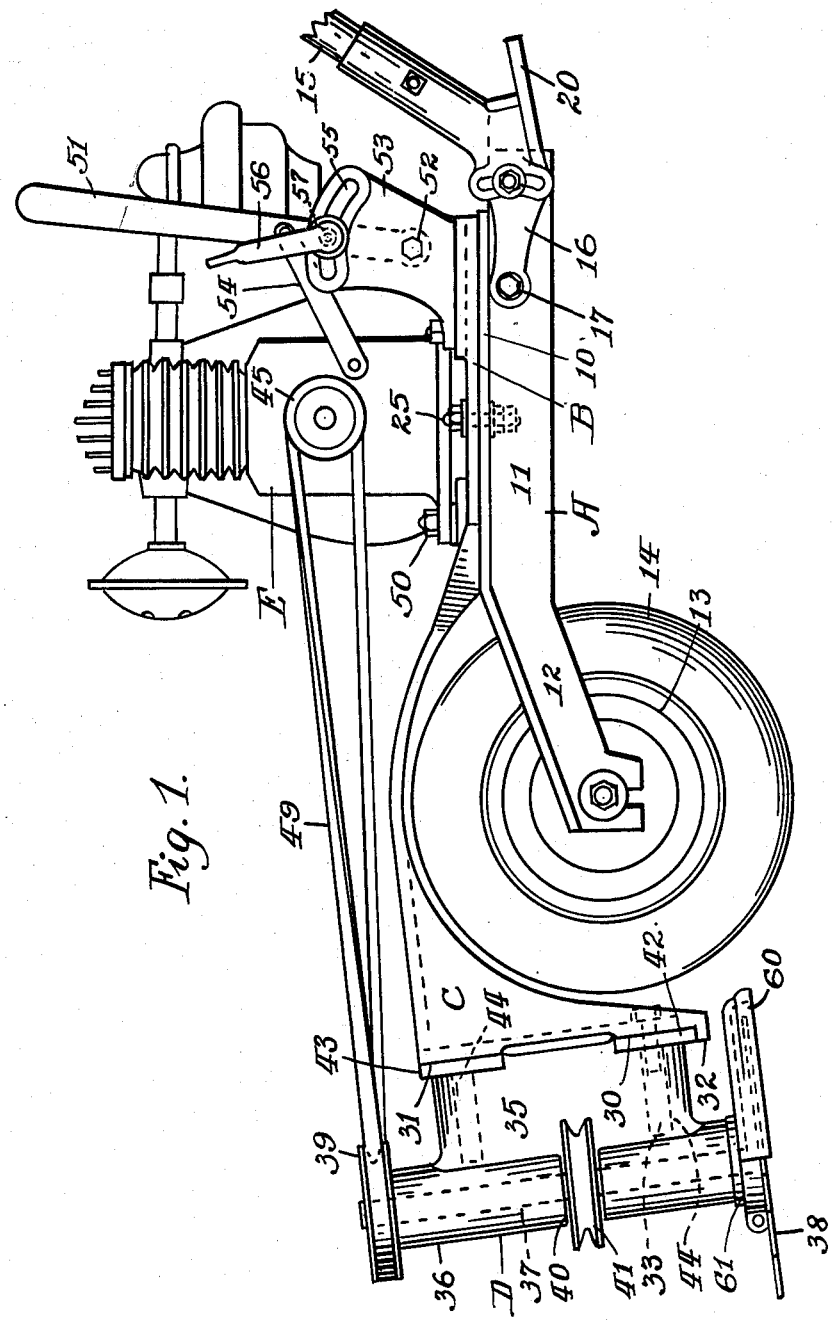
Figure 2:
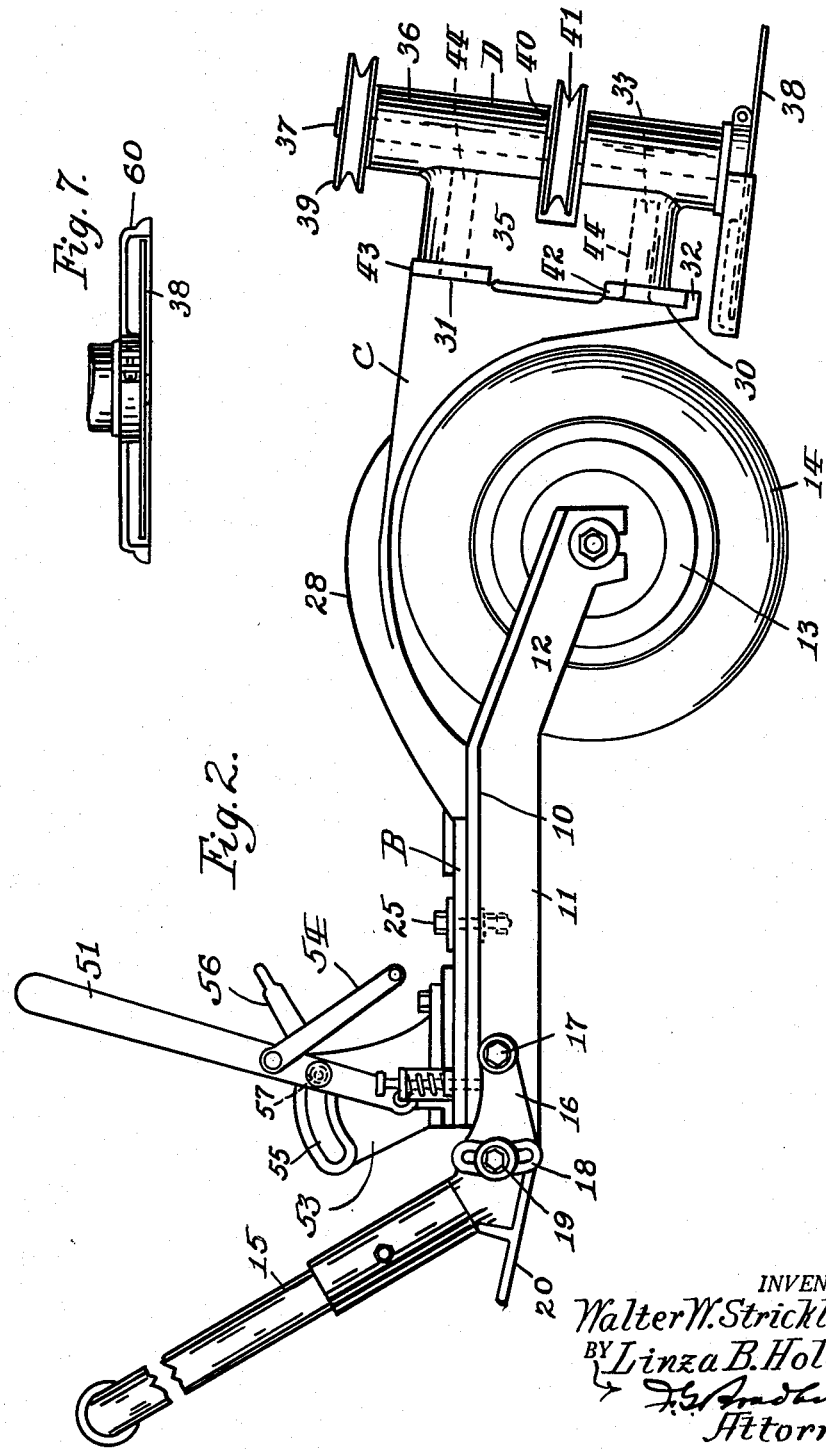
Figure 3:
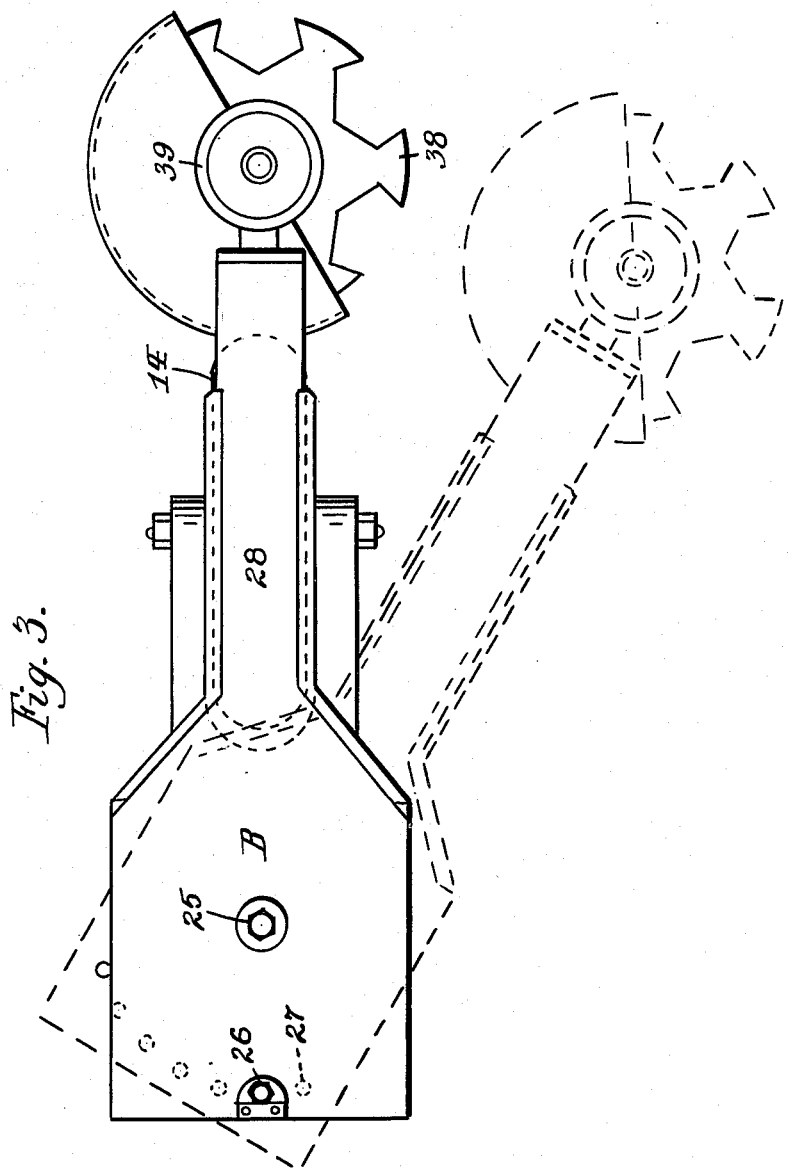

In the accompanying drawings forming part of this specification, Fig. 1 is a side elevation of our combined lawn edger and trimmer when used with its cutting blade disposed for cutting the adjacent edge portion of a lawn horizontally; Fig. 2 is a side elevation when looking at the opposite side of the lawn edger and trimmer from that shown in Fig. 1, the power drive unit for operating the cutting blade being removed; Fig. 3 is a plan of a portion of our improved machine or apparatus when the power unit is removed, the broken line position indicating how the cutter can be extended laterally at an angle, either to the right or left hand side of the carriage; Fig. 4 is a front elevation when the cutting unit is removed from the forward end of the supporting body of the machine; Figs. 5 and 6 are front elevational views showing the cutting unit with its cutting blade disposed vertically on either the right or left hand side of the forward supporting end portion of the body, and Fig. 7 is a side elevational view showing the cutter blade and its housing.

In the drawings, A represents the main supporting carriage which is employed with our machine, said carriage being formed with fixed surfacing 10 which is secured by welding or other suitable means on the longitudinal side bar members 11. These side members resemble a pair of forwardly and downwardly extended yoke arms 12, on the lower forward ends of which the carrier wheel 13 is journaled. A pneumatic tire tread 14 of suitable size and diameter is mounted on said wheel. The rear end of the supporting platform has a handle 15, the side arms of which are tiltingly connected to the sides 11 of the surfacing 10 by the hinge elements 16. Each hinge element is secured by a pintle bolt 17 on the adjacent supporting side arm 11 and is formed with a slotted quadrant 18 through which a binding bolt 19 is adapted when tightened to secure and hold the handle element 15 regulated at inclined height. The lower portions of the hinge elements 16 have a pair of supporting shoes or skids 20 by which the machine can be retained in upright position when at rest on its wheel. Thus a carriage is provided by which the hand bars can be used to lift the rear end of and guide the machine forwardly when in use.

A platform B is pivotally secured horizontally by the vertical king bolt 25 on the surfacing 10 so that it can be maintained normally in the full line horizontal position shown in Fig. 3, or it can be swung radially in a horizontal plane and extended from either side of the carriage, such as indicated by the broken lines and held at any selected graduated horizontal position by the spring releasable stop bolt 26.

The surfacing 10 is provided with engaging holes 27 to receive the stop bolt, said holes being arranged in an arc about the king bolt 25 as a center and at suitable spaced intervals apart. In this manner the platform can be swung and held adjusted either in median position or inclined either to the right or left for the purpose hereinafter described. The forward end of the platform is formed with a reach 28, which extends longitudinally and upwardly and is curved in freely spaced position over the wheel tread. This reach is provided with a normal upwardly inclined supporting body C for the cutter unit D on its forward end.

The supporting body C extends downwardly on its forward portion with its inner surface conforming with and spaced from the wheel tread and is provided with a pair of lower and upper forwardly facing and vertical flat seats 30 and 31. The lower seat 30 terminates downwardly in a forwardly and laterally extending key shoulder 32 and is provided at substantially right angles to the plane of its surface with a central forwardly extending relatively large key pin 33 over which the cutter unit D is adapted to engage the supporting body C and interlock thereon by the key shoulder 32 as hereinafter described.

The cutter unit D has an elongated body 35 which is formed with a longitudinal integral cylindrical housing 36, in which a drive shaft 37 is journaled freely and longitudinally. A cutter disk 38 is mounted on the lower end of said shaft and a V pulley 39, of suitable diameter is mounted on the opposite end of the shaft. A suitable opening 40 in the housing 36 is provided through which a second pulley 41, which is similar in diameter and shape to pulley 39 is mounted rigidly on shaft 37 and extends outwardly through said opening 40. The inner side of the body 35 of the cutter unit facing inwardly on the carriage is provided with a pair of rectangular shaped head sections 42 and 43, which are adapted to engage and coincide with the surfaces 30 and 31 on the supporting body C. Each of these head sections is provided with a key pin 33 receiving opening 44, which enables the cutter unit D to be engaged over the pin 33, in the upwardly directed interlocked position shown in Figs. 1 and 2 when the cutter disk 38 is maintained in substantially horizontal or slightly inclined position for cutting growth. Also the cutter unit can be secured by one of the rectangular head sections 42 or 43, over the pin 33. When thus engaged the key shoulder 32 will hold the cutter unit extending either upwardly or horizontally with either one of the pulleys 39 or 41 in substantial alignment with the drive pulley 45 which is driven by the motor E (Fig. 1).

When assuming any one of its positions the cutter unit is held in interlocked condition on the supporting head by the drive belt 49.

In Fig. 4 the front portion of the supporting body C is shown when facing the seats 30 and 31. In this view the key pin 33 and key shoulder 32 are also shown by which the cutter unit is adapted to be held in any of its positions, namely in vertical position as shown in Fig. 1 for cutting horizontally, in horizontal position on one side of the seat head for cutting vertically as shown in Fig. 5, and in vertical position on the opposite side of the seat head for cutting vertically as shown in Fig. 6. In either of these positions one of the driven pulleys on the cutter unit is held in alignment with the drive pulley 45 on the propelling motor E and is driven by the belt 49.

The drive motor E for operating the cutter unit D (Fig. 1), may be of any desired kind, that shown being an internal combustion engine which is slidably secured to be adjusted for belt tightening and removal on the table B, the mode of fastening being by slidably securing longitudinally by bolts such as 50. These bolts are disposed through slotted connections in adjusted position on the table whereby the drive belt 49 is held taut, by the lever arm 51, which latter is pivoted by its lower end on the slotted quadrant 53. The lever is connected by the link 54 with the motor body so that when the lever is swung by hand the belt can be tightened and held taut. When released the belt can be removed and the cutter head removed to permit reapplication in selected position.

To lock the motor in taut position a threaded binding bolt 57 (Figs. 1 and 2) which is connected through the slot 55 in the quadrant with handle 51 may be tightened to grip the quadrant by swinging the hand operating arm 56. In this manner the belt 49 is held at such angle in relation to the cutter unit so as to apply the belt in holding engagement with either of the pulleys, in the various positions of the cutter head or unit to prevent the belt from becoming disconnected.

While the cutter element is held with the cutting disk in vertically disposed position at either side of the supporting head C, the machine can be made to most conveniently and effectively clean cut either a right or left edge portion of a lawn or other growth vertically or horizontally. To assist in most effectively applying this cutting action the table can be adjusted in angularity horizontally so as to extend the disk outwardly to the right or left side of the machine, as indicated in Fig. 3, and in whichever direction will enable the most effective application of trimming and edge cutting action by the cutting disk. Also when the cutter disk is held horizontally or slightly declining forwardly as shown, the table can be swung and adjusted horizontally so as to extend the disk outwardly either to the right or left, whichever direction will enable the most effective application for sharply cutting and trimming action of the edge portion of a lawn or other growth. These adjustments of the cutter head can be easily and quickly made without the use of tools and by anyone not skilled in mechanics. Also the construction provided by our improvements is light in weight, and sturdy in construction.

Modifications in construction are contemplated within the spirit of the invention and the scope of the following claims.

We claim:

1. A lawn edger and trimmer, comprising, a carriage having a carrier wheel and having a cutting unit thereon journaled on its forward portion to permit guiding movement, a support pivoted to swing horizontally on said carriage and having a forwardly extended portion shaped freely and longitudinally over beyond the carrier wheel and a drive unit coupled to said cutting unit for operating the latter.

2. A lawn edger and trimmer, comprising a carriage having a carrier wheel journaled on its forward portion to permit longitudinal guiding movement, a platform pivoted to swing laterally on said carriage and having a supporting arm shaped freely and longitudinally over the carrier wheel and a forward head portion on said arm spaced freely from the periphery of said wheel and extended downwardly, a cutting unit mounted on said head portion and a drive unit coupled to said cutting unit for operating the latter.

3. A lawn edger and trimmer comprising, a carriage having a carrier wheel journaled on its forward portion to permit guiding movement, a body member pivoted to swing laterally on said carriage and having a supporting forward end portion arcked longitudinally and freely over and beyond the carrier wheel and having a forward supporting head portion extended downwardly free from said wheel, and a rotary drive unit coupled to said cutting unit for operating the latter.

4. A lawn edger and trimmer, comprising, a carriage having a single carrier wheel journaled on its forward portion to permit guiding movement, a supporting member pivoted to swing laterally on said carriage, releasable engaging means between the carriage and supporting member for regulating the horizontal angularity of the supporting member on said carriage, said supporting member having a forwardly directed supporting end portion arcked longitudinally and freely over and downwardly beyond the carrier wheel, a cutting unit selectively secured in horizontal or upward position on the forward end portion of said supporting member, and a drive unit on said supporting member coupled to said cutting unit.

5. A lawn edger and trimmer, comprising, a carriage having a single carrier wheel journaled on its forward portion to permit guiding movement, a supporting member pivoted to swing laterally on said carriage, releasable engaging means between the carriage and supporting member for selectively regulating the horizontal angularity of the supporting member at either side of the carriage, said supporting member having a forward supporting end portion arcked freely over and downwardly beyond the carrier wheel, a cutting unit secured with its cutting element in selected medial horizontal position or at either side of said head, and actuating means movable with said supporting member for driving the cutting unit in any of its selected positions.

6. A lawn edger and trimmer, comprising, a carriage having a single carrier wheel journaled on its forward end, a platform pivoted vertically to permit swinging horizontally at either side of the carriage, said platform having a supporting head arcked forwardly and freely over and downwardly in its medial position beyond said wheel, a cutting unit having a supporting body, a shaft journaled upon said supporting body, cutter and two drive pulleys spaced apart and mounted upon said shaft, means for securing said cutter unit in selectable position on said supporting head to apply the cutter unit so as to cut horizontally or vertically at either side or in median position on the carriage, a power unit mounted on said platform, and a drive connection between the power unit and either of said drive pulleys according to the selected positions assumed by the cutter unit.

7. A hand controlled one wheel lawn edger and trimmer, comprising, a carriage having a single wheel journaled below its body portion to permit guiding movement, a supporting member pivoted to swing laterally on said carriage, releasable engaging means between the carriage and said supporting member for maintaining the horizontal angularity of the supporting member at either side of said carriage, said supporting member having a forward supporting end portion arcked longitudinally and freely over and downwardly beyond the carriage wheel, a cutting unit secured selectively in horizontal or vertical position on the forward end portion of said supporting member to permit lawn trimming and edge cutting by said cutting unit at either side of the carriage, and a drive unit on said supporting member coupled to said cutting unit.

WALTER W. STRICKLEN.
LINZA B. HOLSTON.

REFERENCES CITED

The following references are of record in the file of this patent:

UNITED STATES PATENTS

| Number | Name | Date |
|---|---|---|
| 290,865 | Dawson | Dec. 25, 1883 |
| 1,447,606 | Seymour | Mar. 6, 1923 |
| 2,139,353 | Bruder | Dec. 6, 1938 |
| 2,200,368 | Iverson | May 14, 1940 |
| 2,365,408 | Hillyer | Dec. 19, 1944 |
| 2,439,607 | Irwin | Apr. 13, 1948 |
| 2,461,188 | Stoner | Feb. 8, 1949 |
| 2,462,314 | Fuqua | Feb. 22, 1949 |
| 2,496,982 | Burkholder | Feb. 7, 1950 |